US009784366B2

(12) United States Patent
Long et al.

(10) Patent No.: US 9,784,366 B2
(45) Date of Patent: Oct. 10, 2017

(54) FAST VALVE ACTUATION SYSTEM FOR AN AUTOMATIC TRANSMISSION

(71) Applicant: Allison Transmission, Inc., Indianapolis, IN (US)

(72) Inventors: Charles F. Long, Pittsboro, IN (US); Darren J. Weber, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 384 days.

(21) Appl. No.: 14/508,772

(22) Filed: Oct. 7, 2014

(65) Prior Publication Data

US 2015/0020633 A1    Jan. 22, 2015

Related U.S. Application Data

(63) Continuation of application No. 12/943,322, filed on Nov. 10, 2010, now Pat. No. 8,852,049.

(60) Provisional application No. 61/287,003, filed on Dec. 16, 2009.

(51) Int. Cl.
| F16H 15/38 | (2006.01) |
| F16H 61/02 | (2006.01) |
| F16H 61/06 | (2006.01) |
| F16H 61/664 | (2006.01) |
| F16K 11/14 | (2006.01) |

(52) U.S. Cl.
CPC ......... *F16H 61/0276* (2013.01); *F16H 15/38* (2013.01); *F16H 61/0206* (2013.01); *F16H 61/061* (2013.01); *F16H 61/6648* (2013.01); *F16K 11/14* (2013.01); *Y10T 74/20024* (2015.01); *Y10T 137/87764* (2015.04)

(58) Field of Classification Search
CPC .. F16H 15/38; F16H 61/0276; F16H 61/0206; F16H 61/061; F16H 61/6648
USPC .................................................. 476/2, 9, 10
See application file for complete search history.

(56) References Cited

U.S. PATENT DOCUMENTS

| 2,706,419 A | 4/1955 | Kelbel |
| 4,838,126 A | 6/1989 | Wilfinger et al. |
| 4,922,788 A | 5/1990 | Greenwood |
| 5,090,951 A | 2/1992 | Greenwood |
| 5,217,418 A | 6/1993 | Fellows et al. |

(Continued)

FOREIGN PATENT DOCUMENTS

| EP | 1876375 | 1/2008 |
| GB | 2351510 | 10/2001 |

(Continued)

OTHER PUBLICATIONS

Written Opinion from the Korean Intellectual Property Office for Application No. 10-2012-7017025, dated Nov. 21, 2016, 7 pages.

(Continued)

*Primary Examiner* — William C Joyce
(74) *Attorney, Agent, or Firm* — Barnes & Thonburg LLP

(57) ABSTRACT

A fast valve actuation system for an automatic vehicle transmission includes a pair of spring-biased shift valves. Solenoids control the application of pressurized hydraulic fluid to the head of each of the shift valves. Each shift valve has at least one port that is coupled to a fluid chamber of a torque transferring mechanism of an automatic transmission. The position of each of the shift valves determines whether its ports are connected with fluid pressure. Fluid passages connect the head of each shift valve to the spring pocket of the other shift valve.

18 Claims, 7 Drawing Sheets

(56) References Cited

U.S. PATENT DOCUMENTS

| | | | |
|---|---|---|---|
| 5,232,414 A | 8/1993 | Fellows et al. |
| 5,242,337 A | 9/1993 | Greenwood |
| 5,263,907 A | 11/1993 | Fellows |
| 5,308,297 A | 5/1994 | Greenwood |
| 5,308,298 A | 5/1994 | Lambert |
| 5,316,526 A | 5/1994 | Fellows |
| 5,338,268 A | 8/1994 | Greenwood |
| 5,395,292 A | 3/1995 | Fellows et al. |
| 5,401,221 A | 3/1995 | Fellows et al. |
| 5,423,727 A | 6/1995 | Fellows |
| 5,437,204 A | 8/1995 | Person |
| 5,453,061 A | 9/1995 | Fellows |
| 5,521,819 A | 5/1996 | Greenwood |
| 5,564,993 A | 10/1996 | Robinson |
| 5,564,998 A | 10/1996 | Fellows |
| 5,643,121 A | 7/1997 | Greenwood et al. |
| 5,667,456 A | 9/1997 | Fellows |
| 5,766,105 A | 6/1998 | Fellows et al. |
| 5,820,508 A | 10/1998 | Konig et al. |
| 5,820,513 A | 10/1998 | Greenwood |
| 5,895,337 A | 4/1999 | Fellows et al. |
| 5,938,557 A | 8/1999 | Greenwood |
| 5,971,885 A | 10/1999 | Greenwood et al. |
| 5,980,420 A | 11/1999 | Sakamoto et al. |
| 6,030,310 A | 2/2000 | Greenwood et al. |
| 6,066,067 A | 5/2000 | Greenwood |
| 6,071,209 A | 6/2000 | Greenwood |
| 6,273,839 B1 | 8/2001 | Dutson |
| 6,292,732 B1 | 9/2001 | Steinmetz et al. |
| 6,306,060 B1 | 10/2001 | Dutson et al. |
| 6,312,356 B1 | 11/2001 | Greenwood |
| 6,364,811 B1 | 4/2002 | Hubbard et al. |
| 6,464,614 B2 | 10/2002 | Dutson |
| 6,585,617 B1 | 7/2003 | Mooreman et al. |
| 6,626,793 B1 | 9/2003 | Greenwood |
| 6,666,791 B1 | 12/2003 | Greenwood |
| 6,835,147 B2 | 12/2004 | Iwata et al. |
| 6,979,276 B2 | 12/2005 | Murray |
| 7,018,320 B2 | 3/2006 | Robinson et al. |
| 7,056,261 B2 | 6/2006 | Fuller |
| 7,140,993 B2 | 11/2006 | Long et al. |
| 7,160,226 B2 | 1/2007 | Fuller |
| 7,278,951 B2 | 10/2007 | Fuller |
| 7,318,786 B2 | 1/2008 | Greenwood et al. |
| 7,407,459 B2 | 8/2008 | Greenwood et al. |
| 7,491,149 B2 | 2/2009 | Greenwood et al. |
| 7,530,916 B2 | 5/2009 | Greenwood |
| 7,563,194 B2 | 7/2009 | Murray |
| 7,614,973 B2 | 11/2009 | Parthuisot |
| 7,625,309 B2 | 12/2009 | Fuller |
| 7,632,208 B2 | 12/2009 | Greenwood et al. |
| 7,637,841 B2 | 12/2009 | Dutson |
| 7,740,556 B2 | 6/2010 | Iwasa et al. |
| 7,951,041 B2 | 5/2011 | Dutson |
| 7,955,210 B2 | 6/2011 | Greenwood et al. |
| 8,852,049 B2 | 10/2014 | Long |
| 2001/0041642 A1 | 11/2001 | Miyata |
| 2004/0038773 A1 | 2/2004 | Robinson et al. |
| 2005/0043138 A1 | 2/2005 | Fuller |
| 2005/0143216 A1 | 6/2005 | Greenwood et al. |
| 2005/0176547 A1 | 8/2005 | DeFreitas et al. |
| 2005/0211295 A1 | 9/2005 | Long et al. |
| 2006/0142110 A1 | 6/2006 | Greenwood et al. |
| 2006/0160656 A1 | 7/2006 | Dutson |
| 2006/0184303 A1 | 8/2006 | Long et al. |
| 2006/0201766 A1 | 9/2006 | Fuller |
| 2007/0072736 A1 | 3/2007 | Defreitas et al. |
| 2007/0112495 A1 | 5/2007 | Murray |
| 2007/0142163 A1 | 6/2007 | Murray |
| 2007/0275817 A1 | 11/2007 | Newall |
| 2008/0085801 A1 | 4/2008 | Sedoni et al. |
| 2008/0146399 A1 | 6/2008 | Oliver et al. |
| 2008/0153659 A1 | 6/2008 | Greenwood |
| 2008/0176709 A1 | 7/2008 | Wu et al. |
| 2008/0269001 A1 | 10/2008 | Greenwood et al. |
| 2009/0048054 A1 | 2/2009 | Tsuchiya et al. |
| 2009/0062065 A1 | 3/2009 | Field et al. |
| 2009/0075772 A1 | 3/2009 | Ellis et al. |
| 2009/0203486 A1 | 8/2009 | Murray |
| 2009/0253552 A1 | 10/2009 | Foster |
| 2009/0305840 A1 | 12/2009 | Oliver |
| 2011/0138898 A1 | 6/2011 | Long et al. |
| 2011/0143882 A1 | 6/2011 | Long et al. |
| 2011/0144872 A1 | 6/2011 | Long et al. |
| 2011/0144925 A1 | 6/2011 | Long et al. |

FOREIGN PATENT DOCUMENTS

| | | |
|---|---|---|
| GB | 2368618 | 5/2002 |
| GB | 2364531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |
| JP | 2003120797 A | 4/2003 |
| WO | 9740292 | 10/1997 |

OTHER PUBLICATIONS

Written Opinion from the State Intellectual Property Office for the People's Republic of China for Application No. 201080061521.8, dated Apr. 7, 2015, 3 pages.
Written Opinion from the State Intellectual Property Office for the People's Republic of China for Application No. 201080061521.8, dated Oct. 19, 2015, 2 pages.
International Search Report and the Written Opinion for International Application No. PCT/US2010/056244, dated Jan. 21, 2011 (9 pages).
Torotrak Full toroidal variator (http://www.torotrak.com/IVT/works/variator.htm) 5 pages (accessed Sep. 24, 2009).
International Search Report and the Written Opinion for International Application No. PCT/US2010/060032, dated Feb. 11, 2011 (9 pages).
International Search Report and the Written Opinion for International Application No. PCT/US2010/056247, dated Jan. 21, 2011 (10 pages).
International Search Report and the Written Opinion for International Application No. PCT/US2010/058705, dated Feb. 11, 2011 (12 pages).
International Search Report and the Written Opinion for International Application No. PCT/US2010/058707, dated Feb. 1, 2011 (8 pages).
U.S. Appl. No. 61/286,974, filed Dec. 16, 2009 (31 pages).
U.S. Appl. No. 61/286,984, filed Dec. 16, 2009 (33 pages).
U.S. Appl. No. 61/287,031, filed Dec. 16, 2009 (39 pages).
U.S. Appl. No. 61/287,038, filed Dec. 16, 2009 (33 pages).
Search Report and Written Opinion of the State Intellectual Property Office of the People's Republic of China for Application No. 201080061521.8 dated May 27, 2014, 22 pages.
U.S. Appl. No. 61/287,003, filed Dec. 9, 2009 (33 pages).
European Search Report for Application No. 10838076.7-1651/2513523, dated Jun. 2, 2016, 8 pages.
Written Opinion of the European Patent Office for Application No. 10838076.7, dated Feb. 9, 2017, 5 pages.

FAST VALVE ACTUATION SYSTEM FOR AN AUTOMATIC TRANSMISSION

This application is a continuation application of U.S. application Ser. No. 12/943,322, entitled "FAST VALVE ACTUATION SYSTEM FOR AN AUTOMATIC TRANSMISSION," which was filed on Nov. 10, 2010, and which claims priority to U.S. Provisional Patent Application Ser. No. 61/287,003, filed Dec. 16, 2009, the entirety of both of which is incorporated herein by reference.

TECHNICAL FIELD

This disclosure relates generally to automatic transmissions, and more particularly, to an electro-hydraulic fast valve actuation system for an automatic transmission.

BACKGROUND

In vehicles with automatic transmissions, a torque converter or other type of fluidic coupling transfers torque from the vehicle engine (or other drive unit) to the transmission. Rather than requiring the vehicle operator to engage in manual gear-shifting, automatic transmissions have an on-board control system that can automatically control changes in the gear ratio once the vehicle is shifted into a forward or reverse range by the operator.

The on-board control system includes electro-hydraulic components. The hydraulic components include valving and fluid passages that direct pressurized hydraulic fluid to clutches to be applied and drain hydraulic fluid from clutches to be released, in response to electrical signals received from an electronic control unit.

The electro-hydraulic controls often include directional control valves, also known as shift valves or logic valves. The shift valves have ports that are coupled to fluid chambers of the transmission clutches. When the shift valves change position, ports on the valves are opened or closed as needed to direct pressurized hydraulic fluid to the appropriate clutches or other destination.

A solenoid often controls the changes in position of a shift valve. The solenoid receives electrical signals from the electronic control unit and outputs fluid pressure to the shift valve in response to the electrical signals. The fluid pressure output by the solenoid strokes the shift valve if the amount of pressure is sufficient to overcome the biasing force of the shift valve's return spring.

When the position of the shift valve changes, a clutch's fluid chamber may be connected to, or disconnected from, a source of pressurized hydraulic fluid. If the position of the shift valve connects a clutch to fluid pressure, the clutch is applied. The clutch is released if the position of the shift valve causes the clutch to be disconnected from the source of fluid pressure.

The electro-hydraulic controls also typically include pressure control valves, which may be known as trim valves. A trim valve controls the rate at which fluid pressure is applied to the clutch to which the trim valve is coupled (e.g. directly or via a shift valve). The trim valve thus controls how slowly or quickly the clutch connected to the trim valve is applied or released.

SUMMARY

According to one aspect of this disclosure, an electro-hydraulic control for an automatic transmission includes a first shift valve axially translatable in a first valve chamber of a hydraulic control circuit for an automatic transmission. The first shift valve has a first valve head, a first spool, a first plurality of axially-spaced lands defining a plurality of ports on the first shift valve, at least one of the ports being in fluid communication with a first torque transferring mechanism of the automatic transmission, and a first spring chamber axially spaced from the first valve head. The control also includes a first electro-hydraulic actuator having a first output in fluid communication with the first shift valve, and a second shift valve axially translatable in a second valve chamber of the hydraulic control circuit. The second shift valve includes a second valve head, a second spool, a second plurality of axially-spaced lands defining a plurality of ports on the second shift valve, at least one of the ports being in fluid communication with a second torque transferring mechanism of the automatic transmission, and a second spring chamber axially spaced from the second valve head. The control also includes a second electro-hydraulic actuator having a second output in fluid communication with the second shift valve, a first passage fluidly coupling the first valve head and the second spring chamber to the first output, and a second passage fluidly coupling the second valve head and the first spring chamber to the second output.

The first electro-hydraulic actuator may be actuatable by an electronic control unit to output fluid pressure to the head of the first shift valve and the spring chamber of the second shift valve at substantially the same time. The second electro-hydraulic actuator may similarly be actuatable by the electro-hydraulic control actuator to output fluid pressure to the head of the second shift valve and the spring chamber of the first shift valve at substantially the same time.

The control may include a first pressure control valve selectively coupled to the first torque transferring mechanism through a port of the first shift valve and a second pressure control valve selectively coupled to the second torque transferring mechanism through a port of the second shift valve. The control may include a third fluid passage selectively coupling the first port of the first shift valve to a third pressure control valve. The third fluid passage may selectively couple the second torque transferring mechanism to the third pressure control valve through the second shift valve.

The first shift valve may include a first land adjacent the first valve head and a second land axially spaced from the first land to define a first port, wherein the first torque transferring mechanism is coupled to the first port. The first spring chamber may be axially spaced from the second land.

The first and second shift valves may be fluidly coupled to pressure control valves to permit the first and second torque transferring mechanisms to be connected to fluid pressure at the same time. The first and second electro-hydraulic actuators may be independently actuatable to permit one of the first and second torque transferring mechanisms to be connected to fluid pressure while the other of the first and second torque transferring mechanisms is not connected to fluid pressure. In some embodiments, the first and second torque transferring mechanisms may be clutches. In some embodiments, the first and second torque transferring mechanisms may be opposing sides of a variator disk actuator.

The first and second passages may prevent the first and second shift valves from stroking at the same time. In some embodiments, the first and second passages may supply fluid pressure to sequentially stroke one of the first and second shift valves and destroke the other of the first and second shift valves in less than about 0.08 seconds.

According to another aspect of this disclosure, an automatic transmission includes a variable ratio unit to transfer torque from a vehicle drive unit to a transmission output shaft, and a hydraulic circuit fluidly coupled to the variable ratio unit. The hydraulic circuit includes a first fluid chamber pressurizable to apply a first torque transferring mechanism of the variable ratio unit, a second fluid chamber pressurizable to apply a second torque transferring mechanism of the variable ratio unit, a first shift valve fluidly coupled to the first fluid chamber to selectively direct fluid pressure to the first fluid chamber, and a second shift valve fluidly coupled to the second fluid chamber to selectively direct fluid pressure to the second fluid chamber. The first and second shift valves are in fluid communication with each other to connect one of the first and second fluid chambers to fluid pressure and disconnect the other of the first and second fluid chambers from fluid pressure in rapid succession.

Each of the first and second shift valves may have a valve head and a spring chamber axially spaced from the valve head, where the hydraulic circuit includes a first passage fluidly coupling the valve head of the first shift valve with the spring chamber of the second shift valve and a second passage fluidly coupling the valve head of the second shift valve with the spring chamber of the first shift valve. In some embodiments, the first and second passages do not intersect with each other.

The automatic transmission may include a first electro-hydraulic actuator fluidly coupled to the valve head of the first shift valve and a second electro-hydraulic actuator fluidly coupled to the valve head of the second shift valve, where the first electro-hydraulic actuator is actuatable by electrical signals to substantially simultaneously output fluid pressure to the valve head of the first shift valve and the first passage. The first and second shift valves may be configured to permit both of the first and second fluid chambers to be connected to fluid pressure at the same time. In some embodiments, the first and second torque transferring mechanisms may be clutches. In some embodiments, the first and second torque transferring mechanisms may be variator disk actuators in a continuously variable ratio transmission.

According to a further aspect of this disclosure, a valve actuation method for an automatic transmission includes detecting a change in torque direction, and stroking the first shift valve and destroking the second shift valve in rapid succession in response to the detected change in torque direction.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

In figures that depict schematic illustrations, the components may not be drawn to scale, and lines shown as connecting the various blocks and components shown therein represent connections which, in practice, may include one or more electrical, mechanical and/or fluid connections, passages, communication links, couplings or linkages, as will be understood by those skilled in the art and as described herein. In general, like structural elements on different figures refer to identical or functionally similar structural elements.

DETAILED DESCRIPTION

Aspects of this disclosure are described with reference to illustrative embodiments shown in the accompanying drawings and described herein. While the present invention is described with reference to these illustrative embodiments, it should be understood that the present invention as claimed is not limited to the disclosed embodiments. For example, while certain aspects of this disclosure are discussed herein in the context of a continuously variable transmission, it will be understood by those skilled in the art that aspects of the present disclosure are applicable to other types and configurations of automatic transmissions.

Figure 1:
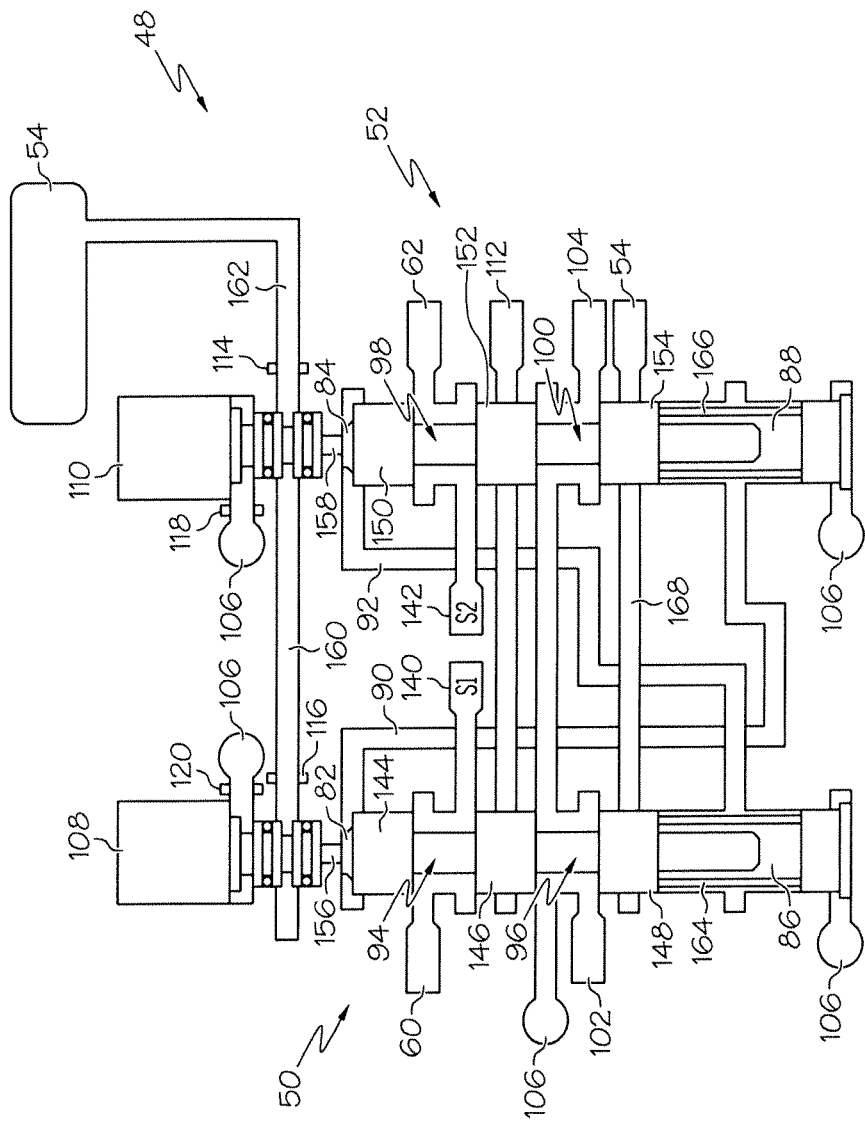
FIGS. 1-3 are schematic representations of different states of a fast valve actuation system for an automatic transmission.
Figure 2:
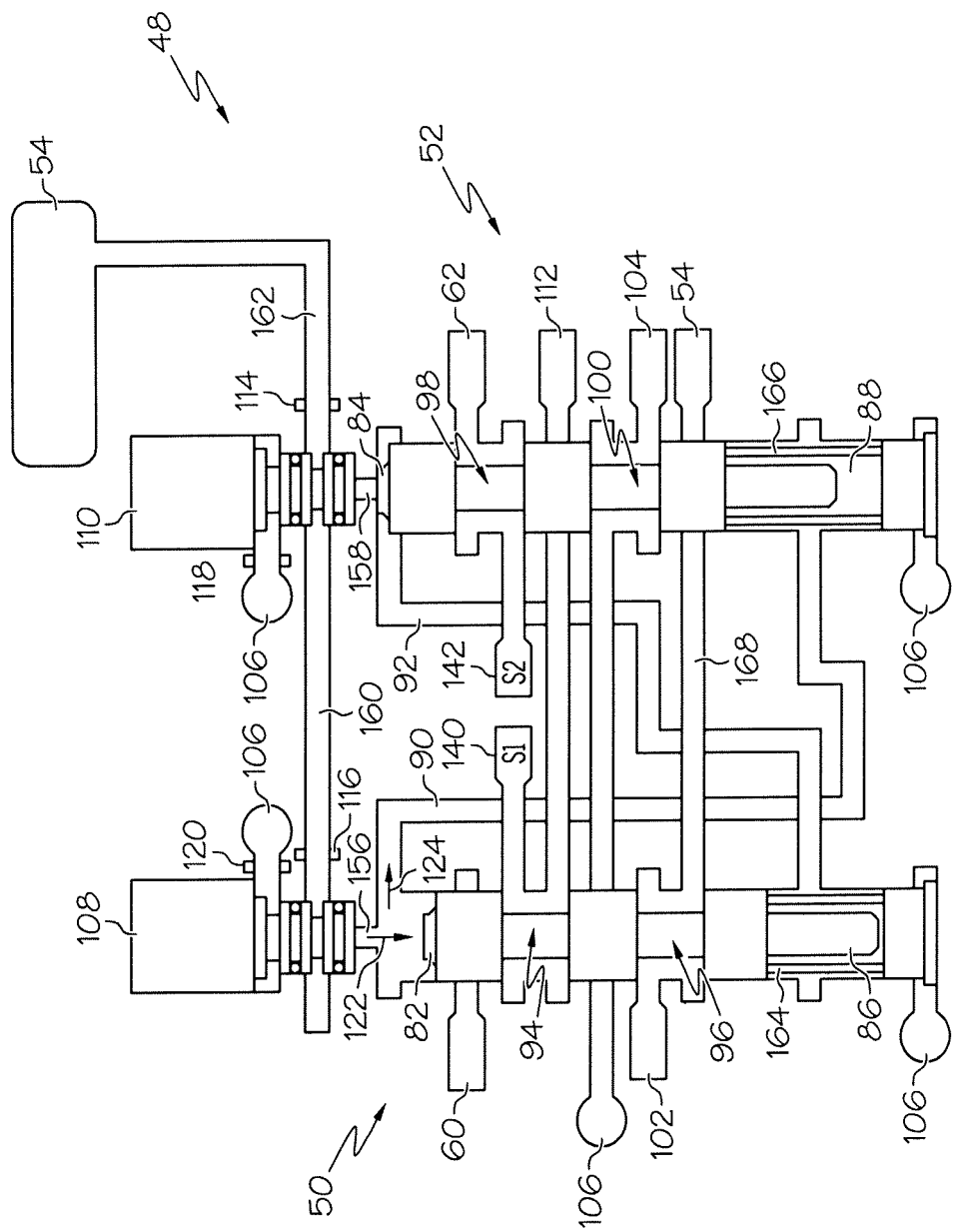
Figure 3:
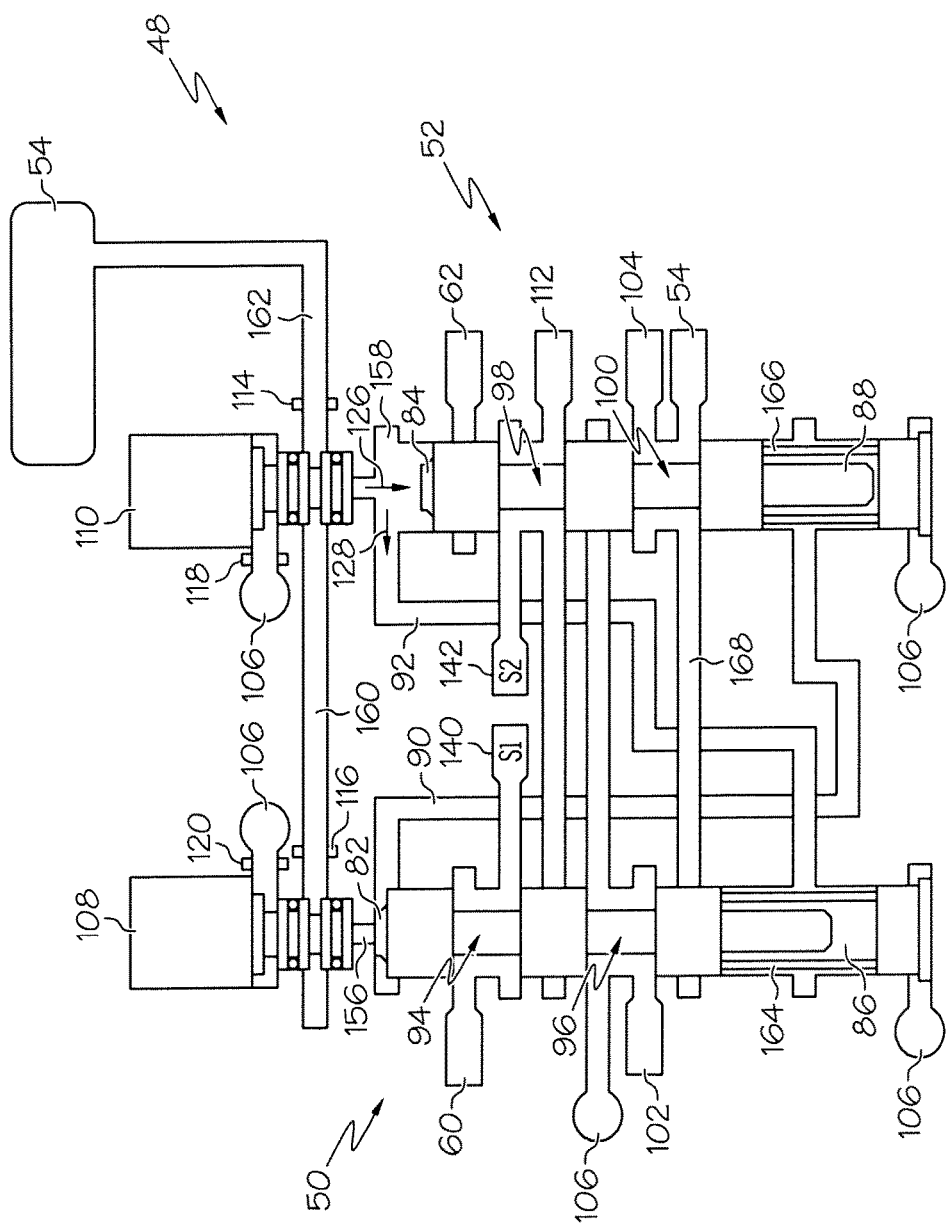

As shown in FIGS. 1-3, a fast valve actuation system 48 includes a pair of shift valves 50, 52. Each of the shift valves 50, 52 resides in a valve chamber of a valve body of an electro-hydraulic control system for an automatic transmission. The shift valves 50, 52 are axially movable between destroked and stroked positions in their respective valve chambers.

The shift valve 50 selectively directs fluid pressure to a fluid chamber S1 of a torque transferring mechanism 140 of the automatic transmission. The shift valve 52 selectively directs fluid pressure to another fluid chamber S2 of a torque transferring mechanism 142 of the automatic transmission. The torque transferring mechanisms 140, 142 may be clutches, brakes, variator disk actuators, or the like, in accordance with the particular design of the automatic transmission.

The shift valve 50 includes a valve head 82, a spring pocket 86, and a number of axially-spaced lands 144, 146, 148 therebetween. The lands 144, 146, 148 define ports 94, 96. The spring pocket 86 contains a return spring 164, which biases the shift valve 50 in the destroked position shown in FIG. 1.

Similarly, the shift valve 52 includes a valve head 84, a spring pocket 88, and a number of axially-spaced lands 150, 152, 154 therebetween. The lands 150, 152, 154 define ports 98, 100. The spring pocket 88 contains a return spring 166, which biases the shift valve 52 in the destroked position shown in FIG. 1.

The shift valve 50 is fluidly coupled to an electro-hydraulic actuator 108 by an output passage 156. A source of pressurized hydraulic fluid 54 feeds fluid pressure to the electro-hydraulic actuator 108 through a fluid passage 160. The electro-hydraulic actuator 108 selectively outputs the fluid pressure to either the output passage 156 or to an exhaust chamber 106, in response to electrical signals issued by an electronic control unit 16. An example of the electronic control unit 16 is shown schematically in FIG. 5.

In the illustrations, the electro-hydraulic actuator 108 is a normally-low, on-off solenoid valve. When the electro-hydraulic actuator 108 receives electrical input (i.e. current or voltage) from the electronic control unit 16 (i.e., the electro-hydraulic actuator 108 is "actuated"), the electro-hydraulic actuator 108 outputs fluid pressure from the passage 160 to the output passage 156. In the absence of electrical input, the electro-hydraulic actuator 108 directs fluid pressure from the passage 156 to the exhaust chamber 106. When the electro-hydraulic actuator 108 is actuated, fluid pressure applied to the valve head 82 via the output passage 156 strokes the shift valve 50 as shown in FIG. 2.

The electro-hydraulic actuator 108 includes an orifice 116 in communication with the passage 160 and an orifice 120 in communication with the exhaust chamber 106. The orifices 116, 120 moderate the rate of fluid flow through the fluid passages 160, 106, respectively, to control the rate at which pressure in the fluid passage changes.

In a similar fashion to shift valve 50, the shift valve 52 is fluidly coupled to an electro-hydraulic actuator 110 by an output passage 158. The source of pressurized hydraulic fluid 54 feeds fluid pressure to the electro-hydraulic actuator 110 through a fluid passage 162. The electro-hydraulic actuator 110 selectively connects fluid passage 158 to either the feed passage 162 or to an exhaust passage 106, in response to electrical signals issued by the electronic control unit 16.

In the illustrations, the electro-hydraulic actuator 110 is a normally-low, on-off solenoid valve. When the electro-hydraulic actuator 110 receives electrical input from the electronic control unit 16 (i.e., the electro-hydraulic actuator 110 is "actuated"), the electro-hydraulic actuator 110 outputs fluid pressure from the passage 162 to the output passage 158. In the absence of electrical input, the electro-hydraulic actuator 110 directs fluid pressure from the passage 158 to an exhaust chamber 106. When the electro-hydraulic actuator 110 is actuated, fluid pressure applied to the valve head 84 via the output passage 158 strokes the shift valve 52 as shown in FIG. 3.

The electro-hydraulic actuator 110 includes an orifice 114 in communication with the passage 162 and an orifice 118 in communication with the exhaust chamber 106. The orifices 114, 118 operate similarly to the orifices 116, 120.

As shown in FIGS. 1-3, the port 94 of the shift valve 50 is in fluid communication with the fluid chamber S1 of the torque transferring mechanism 140 both when the shift valve 50 is destroked and when the shift valve 50 is stroked. Similarly, the port 98 of the shift valve 52 is in fluid communication with the fluid chamber S2 of the torque transferring mechanism 142 both when the shift valve 52 is destroked and when the shift valve 52 is stroked.

A number of pressure control (or "trim") systems 60, 62, and 112 are selectively in fluid communication with the fluid chambers S1, S2, depending upon the position of the shift valves 50, 52. The trim system 60 is configured to control the application of fluid pressure to the fluid chamber S1 when the shift valve 50 is destroked. The trim system 62 is configured to control the application of fluid pressure to the fluid chamber S2 when the shift valve 52 is destroked. In the illustrations, each of the trim systems 60, 62, 112 includes a variable-bleed solenoid valve or a similar device that outputs fluid pressure in proportion to electrical input.

When the shift valve 50 is stroked, the port 94 is disconnected from the trim system 60 and is fluidly coupled to a third trim system 112 as shown in FIG. 2. Similarly, when the shift valve 52 is stroked, the port 98 is disconnected from the trim system 62 and is fluidly coupled to the third trim system 112, as shown in FIG. 3. The selective blocking of the trim systems 60, 62 and the use of the trim system 112 are the subject of U.S. Provisional Patent Application Ser. No. 61/286,974, filed Dec. 16, 2009, which is incorporated herein by this reference in its entirety.

The ports 96, 100 of the shift valves 50, 52, are in fluid communication with pressure switches 102, 104, respectively. The pressure switches 102, 104 detect changes in state of the shift valves 50, 52. When the shift valve 50 is stroked, the source of pressurized fluid 54 feeds fluid pressure to the port 96 via a fluid passage 168. The fluid pressure in the port 96 activates the pressure switch 102 and causes the pressure switch 102 to send an electrical signal to the electronic control unit 16. Similarly, when the shift valve 52 is stroked, the source of pressurized fluid 54 feeds fluid pressure to the port 100. The fluid pressure in the port 100 activates the pressure switch 104 and causes the pressure switch 104 to send an electrical signal to the electronic control unit 16. An application of the pressure switches 102, 104 for diagnostic purposes is the subject of U.S. Provisional Patent Application Ser. No. 61/286,984, filed Dec. 16, 2009, which is incorporated herein by this reference in its entirety.

The fast valve actuation system 48 also includes a pair of non-intersecting fluid passages 90, 92. The fluid passage 90 couples the output passage 156 of the electro-hydraulic actuator 108 to valve head 82 of the shift valve 50 and the spring pocket 88 of the shift valve 52. The fluid passage 92 couples the output passage 158 of the electro-hydraulic actuator 110 to the valve head 84 of the shift valve 52 and the spring pocket 86 of the shift valve 50.

In operation, when the electro-hydraulic actuator 108 is actuated (FIG. 2), fluid pressure is output to the valve head 82 of the shift valve 50 and to the spring pocket 88 of the shift valve 52 at the same time, or at nearly the same time, as indicated by the arrows 122, 124. The flow of pressurized fluid to the spring pocket 88 of the shift valve 52 causes the shift valve 52 to destroke in a shorter amount of time than if the shift valve 52 were allowed to destroke normally (i.e., by simply allowing the fluid pressure at the valve head 84 to drain to the exhaust passage 106).

Likewise, when the electro-hydraulic actuator 110 is actuated (FIG. 3), fluid pressure is output to the valve head 84 of the shift valve 52 and to the spring pocket 86 of the shift valve 50 at the same time, or at nearly the same time, as indicated by the arrows 126, 128. The flow of pressurized fluid to the spring pocket 86 increases the speed at which the shift valve 50 destrokes, so that the shift valve 50 destrokes in a shorter amount of time than if the shift valve 50 were allowed to destroke normally. If both of the electro-hydraulic actuators 108, 110 are actuated at the same time (e.g., if one of the electro-hydraulic actuators 108, 110 is actuated, or remains actuated, in error) the fluid pressure directed to the spring pockets 86, 88 via the fluid passages 92, 90 prevents the shift valves 50, 52 from both stroking at the same time, resulting in a valve state that looks similar to FIG. 1. In other words, each one of the shift valves 50, 52 can only be stroked one at a time. Applying the electro-hydraulic actuators 108, 110 simultaneously results in the destroking of the shift valves 50, 52 rather than the stroking of both valves as would normally be the case.

Thus, the fast valve actuation system 48 only has three possible states: a "00" state in which both of the shift valves 50, 52 are destroked, a "10" state in which the shift valve 50 is stroked and the shift valve 52 is prevented from stroking, and a "01" state in which the shift valve 50 is prevented from stroking and the shift valve 52 is stroked. Actuation of only one of the electro-hydraulic actuators 108, 110 is required to, in rapid succession, stroke one of the shift valves 50, 52 and destroke the other of the shift valves 50, 52. Additionally, actuation of only one of the electro-hydraulic actuators 108, 110 simultaneously causes one of the shift valves 50, 52 to stroke and the other of the shift valves 50, 52 to be blocked from stroking.

During a transition from the "10" state to the "01" state, the solenoid 110 is actuated and the solenoid 108 is deactuated. As a result, the spring pocket 86 of the shift valve 50 is pressurized at the same time (or nearly the same time) that the valve head 82 is being exhausted. Also, the valve head 84 of the shift valve 52 is pressurized at the same time (or nearly the same time) that the spring pocket 88 is being exhausted.

Similarly, during a transition from the "01" state to the "10" state, the solenoid 108 is actuated and the solenoid 110 is deactuated. As a result, the spring pocket 88 of the shift valve 52 is pressurized at the same time (or nearly the same time) that the valve head 84 is being exhausted. Also, the valve head 82 of the shift valve 50 is pressurized at the same time (or nearly the same time) that the spring pocket 86 is being exhausted.

Figure 4:
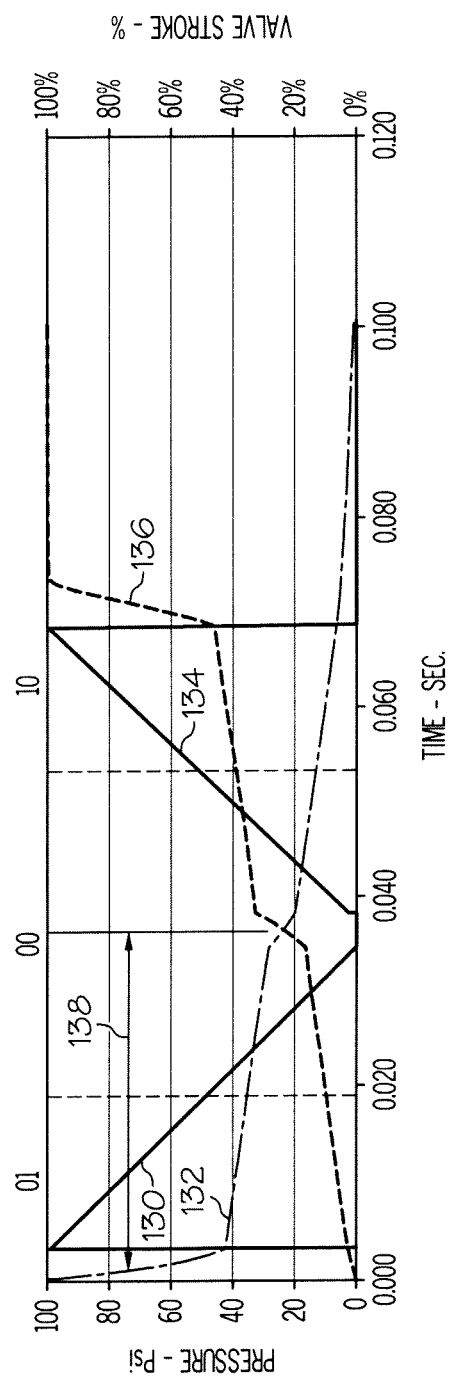
FIG. 4 is a graph depicting experimental data relating to the stroke and destroke times of the valves depicted in FIGS. 1-3.

The fast valve actuation system 48 thereby provides a fast, but sequential, stroking and destroking of the shift valves 50, 52. As shown in FIG. 4, the time required for the shift valves 50, 52 to change states sequentially is less than about 0.08 seconds (as illustrated, in the range of about 0.07 seconds), according to experimental data. In the graph, the line 130 represents the position of the shift valve 52 over time, the line 132 represents the output pressure of the electro-hydraulic actuator 110 over time, the line 134 represents the position of the shift valve 50 over time, and the line 136 represents the output pressure of the electro-hydraulic actuator 108 over time. The line 138 represents the destroke time of the shift valve 52, which is less than 0.04 seconds as shown. The time required to stroke the shift valve 50 is similarly less than 0.04 seconds (as illustrated, in the range of about 0.03 seconds).

The fast sequential actuation of the shift valves 50, 52 reduces the possibility of an indeterminate valve state (e.g. a state in which one or both of the shift valves 50, 52 are partially stroked or both of the shift valves 50, 52 are fully stroked at the same time).

The fast valve actuation system 48 can be applied to situations in which a pair of shift valves are used for transmission control. FIGS. 5A, 5B, 5C and FIG. 6 illustrate one such application, in which the fast valve actuation system 48 is used in a hydraulic control circuit 28 for a transmission 12. In the illustrations, the transmission 12 is a transmission that has a ratio varying unit of the toroidal traction type. Transmissions of this type are available from Torotrak Development, Ltd. of Lancashire, United Kingdom, for example.

Figure 5A:
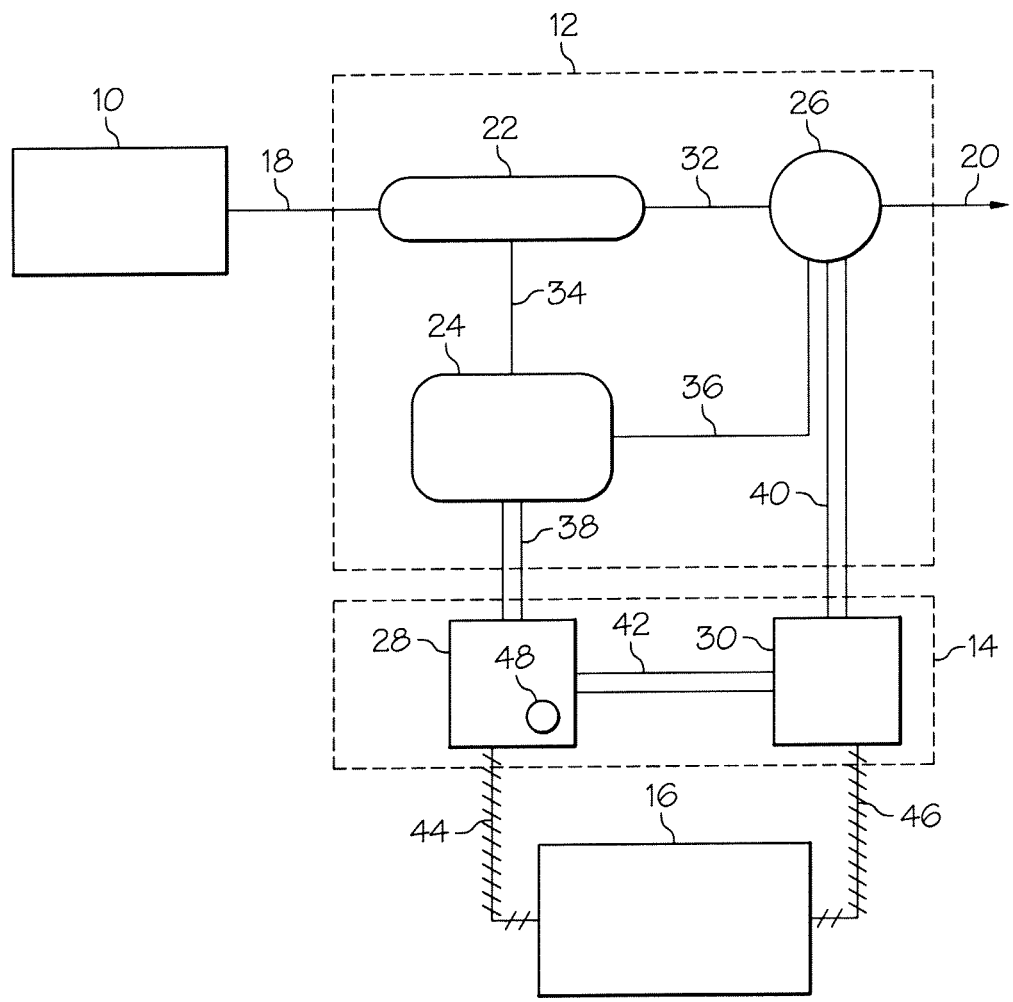
FIG. 5A is a schematic showing the fast valve actuation system of FIGS. 1-3 in the context of an exemplary vehicle transmission.

Transmissions of the type illustrated in FIG. 5A may be referred to by a number of different terms, including continuously variable transmissions, infinitely variable transmissions, toroidal transmissions, continuously variable transmissions of the full toroidal race-rolling traction type, or similar terminology. In this disclosure, for ease of discussion, the term "continuously variable transmission" is used to refer to any of those types of transmissions in which ratios may be controlled by a ratio varying unit, alternatively or in addition to being controlled by a set of gears that provide fixed, stepped ratios.

Referring to FIG. 5A, the transmission 12 is shown in the context of a vehicle power train. A vehicle drive unit 10 outputs torque to a transmission input shaft 18. The drive unit 10 includes an internal combustion engine, such as a spark-ignited engine or diesel engine, an engine-electric motor combination, or the like.

The transmission input shaft 18 connects the drive unit 10 to the transmission 12. The transmission 12 uses a ratio varying unit ("variator") 24 to provide a continuous variation of transmission ratio. The variator 24 is coupled between the transmission input shaft 18 and the transmission output shaft 20 via gearing 22 and one or more clutches 26. In general, the linkages 32, 34, 36 represent the mechanical connections between these components of the transmission 12, as will be understood by those skilled in the art. The linkage 36 is representative of a variator output shaft.

Figure 5B:
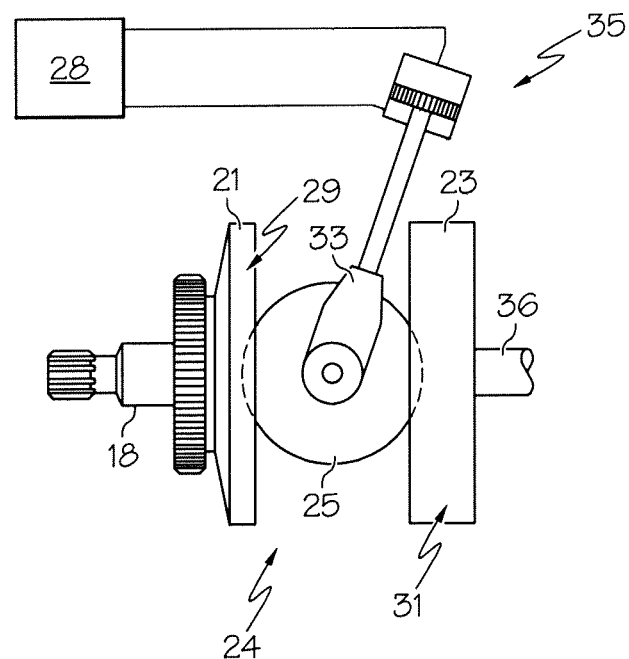
FIG. 5B is a partially schematic simplified side view of a portion of a variator suitable for use in the transmission of FIG. 5A.
Figure 5C:
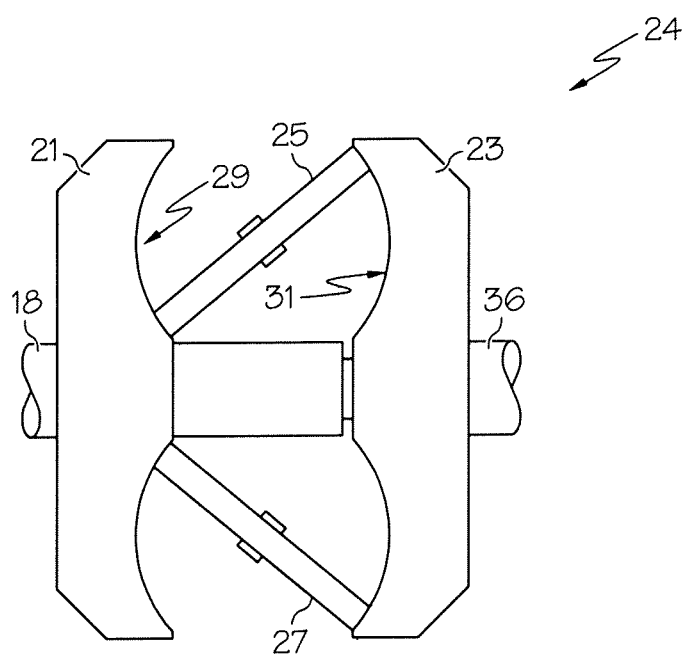
FIG. 5C is a simplified top view of the variator of FIG. 5B, with portions omitted for clarity.

FIGS. 5B and 5C illustrate components of the variator 24. Inside the variator 24, there is a pair of disks 21, 23. The input disk 21 is coupled to and driven by the transmission input shaft 18, while the output disk 23 is coupled to the variator output shaft 36. The space between the inner surfaces 29, 31 of the disks 21, 23 forms a hollow doughnut shape or 'toroid.' A number of rollers 25, 27 are positioned within the toroidal space defined by the surfaces 29, 31. The rollers 25, 27 transmit drive from the input disk 21 to the output disk 23 via a traction fluid (not shown).

Each of the rollers 25, 27 is coupled to a hydraulic actuator 35 by a carriage 33. The hydraulic pressure in the actuators 35 is adjusted by the variator control circuit 28 as described below with reference to FIG. 2. Varying the pressures in the actuators 35 changes the force applied by the actuators 35 to their respective rollers, to create a range of torque within the variator 24. The rollers 25, 27 are capable of translational motion and also rotate about a tilt axis relative to the variator disks 21, 23. The force applied by the hydraulic actuators 35 is balanced by a reaction force resulting from the torques transmitted between the surfaces of the variator disks and the rollers. The end result is that in use, each roller moves and precesses to the location and tilt angle required to transmit a torque determined by the force applied by the hydraulic actuators. FIG. 5C shows an example of the rollers 25, 27 positioned at a tilt angle relative to the surfaces 29, 31, with the actuators 35 omitted for clarity.

In one illustrative implementation, the variator 24 is of the full toroidal type. In such implementation, the variator 24 includes two pairs of input and output disks 21, 23, and there are three rollers positioned in the toroidal space defined by the disks of each pair, for a total of six rollers. Each roller is coupled to a hydraulic actuator 35, for a total of six hydraulic actuators. These additional disks, rollers, and actuators are omitted from the drawings for clarity.

Alternative embodiments of the variator 24 may include a lesser or greater number of disks, rollers, and/or actuators. In one such embodiment, one hydraulic actuator is used to control all of the rollers. In another embodiment, a compact lever arrangement is used in place of the inline piston design shown in FIG. 5B. Moreover, some embodiments may use a partially toroidal rather than a full toroidal configuration.

Operation of the transmission 12 is controlled by an electro-hydraulic control system 14. The electro-hydraulic control system 14 has a variator control circuit 28 and a clutch control circuit 30. In general, the linkages 38, 40, 42 represent the hydraulic fluid connections between components of the variator 24 and the variator control circuit 28, between the clutch or clutches 26 and the clutch control circuit 30, and between the variator control circuit 28 and the clutch control circuit 30.

Aspects of the variator control circuit 28 are described below with reference to FIG. 6. Aspects of the clutch control circuit 30 are the subject of U.S. Provisional Patent Application Ser. No. 61/287,031, filed Dec. 16, 2009, and U.S. Provisional Patent Application Ser. No. 61/287,038, filed Dec. 16, 2009, both of which are incorporated herein by this reference in their entirety.

Operation of the electro-hydraulic control system 14 is controlled by the electronic control unit 16. In general, the linkages 44, 46 represent the electrical connections between the electronic control unit 16 and the electro-hydraulic control circuits 28, 30 of the electro-hydraulic control system 14, as will be understood by those skilled in the art. The linkages 44, 46 may include insulated wiring, wireless links, or other suitable connections for exchanging data, communications and computer instructions. The electronic control unit 16 includes computer circuitry configured to control the operation of the transmission 12 based on inputs from various components of the transmission 12. Such inputs may include digital and/or analog signals received from sensors, controls or other like devices associated with the vehicle components. The electronic control unit 16 processes inputs and parameters and issues electrical control signals to various components of the electro-hydraulic control system 14. The electronic control unit 16 may be implemented as multiple separate logical or physical structures or as a single unit, as will be appreciated by those skilled in the art.

Figure 6:
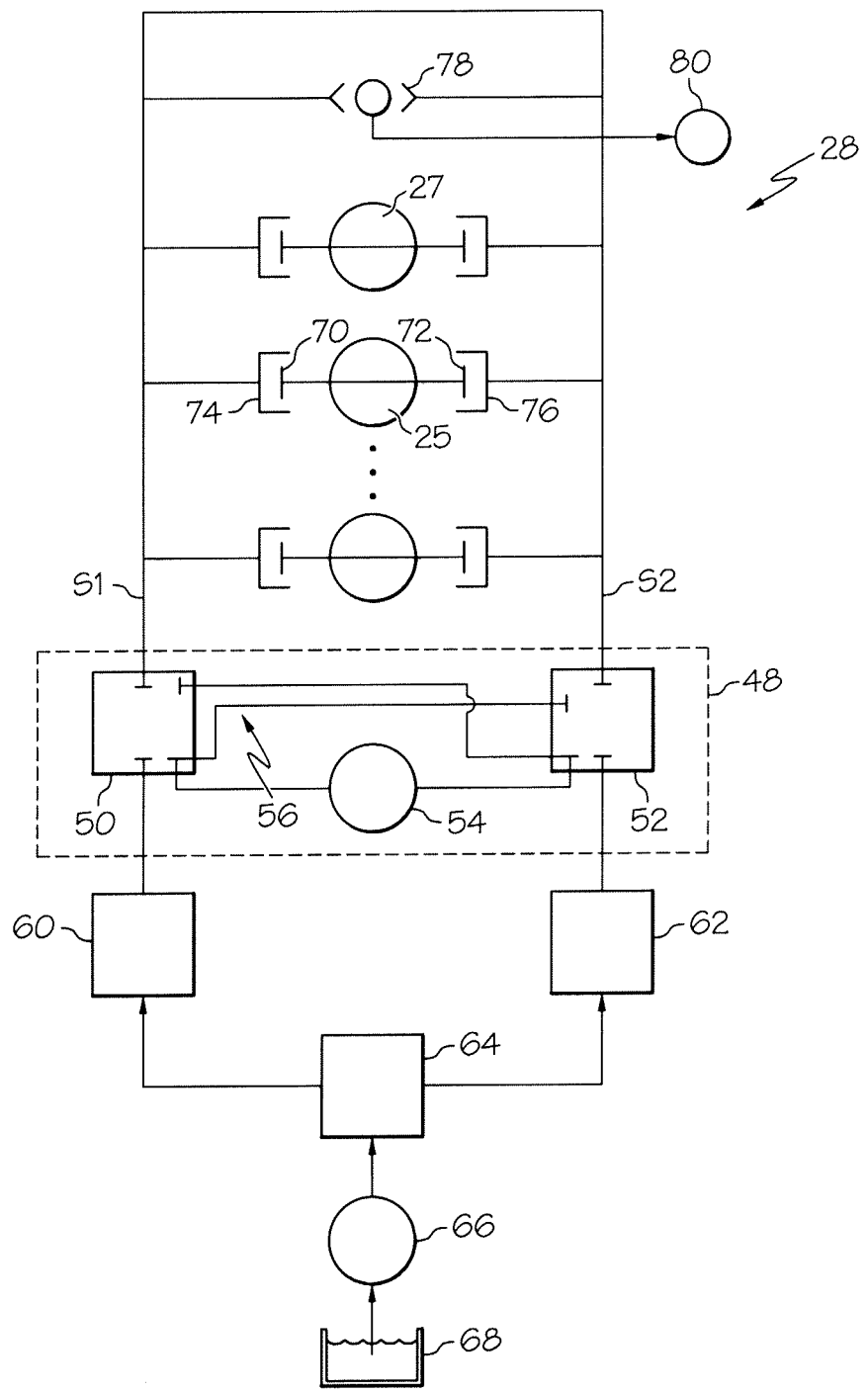
FIG. 6 is a schematic showing the fast valve actuation system of FIGS. 1-3 in the context of a hydraulic control circuit for the transmission of FIGS. 5A-5C.

The fast valve actuation system 48 is incorporated into the variator control circuit 28 as shown in FIG. 6. The variator control circuit 28 applies a controlled force to the variator rollers by adjusting the pressures in the hydraulic actuators 35. As shown schematically in FIG. 6, each of the hydraulic actuators 35 includes a pair of opposing faces 70, 72, which are movable within their respective cylinders 74, 76. Each of the opposing faces 70, 72 is exposed to hydraulic fluid pressure so that the force applied by the actuator 35 to its respective roller is determined by the difference in the two pressures. Accordingly, the force applied by the actuators 35 to the rollers has both a magnitude and a direction. For example, the direction of the force may be considered positive if the face 70 receives greater pressure than the face 72 and negative if the face 72 receives greater pressure than the face 70, or vice versa. Illustratively, each of the hydraulic actuators 35 includes a double-acting piston and cylinder arrangement.

The pressure applied to one side (e.g., the face 70) of the actuator 35 is commonly referred to as "S1," while the pressure applied to the other side (e.g., the face 72) of the actuator 35 is commonly referred to as "S2." The difference between the S1 and S2 pressures determines the force applied by the actuators 35 to their respective rollers.

The actuators 35 and the fluid lines S1, S2 are configured to ensure that the actuators 35 all react the same way, so that all of the rollers 25 of the variator 24 are continuously maintained at the same pressure differential. A "higher pressure wins" valve 78 connects whichever of the two lines S1, S2 is at a higher pressure to an end load arrangement 80.

The variator control circuit 28 adjusts the pressures in the lines S1, S2. A source of hydraulic fluid (i.e., a sump) 68 supplies fluid to a pump 66. Electronically-controlled valves 60, 62, 64 regulate the fluid pressure that is applied to the lines S1 and S2. The valve 64 is a type of pressure control valve commonly referred to as a main modulator valve. The main modulator valve 64 modulates the fluid pressure according to a predetermined desired pressure level for the variator control circuit 28. The valves 60, 62 are trim valves. The valve 60 controls the application of fluid pressure to the line S1 through the shift valve 50, and the valve 62 controls the application of fluid pressure to the line S2 through the shift valve 52.

The position of the shift valve 50 determines whether or not the trim valve 60 supplies fluid pressure to the line S1, and the position of the shift valve 52 determines whether or not the trim valve 62 supplies fluid pressure to the line S2. The trim valve 60 is in fluid communication with the line S1 when the shift valve 50 is destroked, as shown in FIGS. 1 and 3. The trim valve 62 is in fluid communication with the line S2 when the shift valve 52 is destroked, as shown in FIGS. 1 and 2.

The fast valve actuation system 48 is coupled between the trim valves 60, 62 and the rest of the variator control circuit 28. The fast valve actuation system 48 has its own fluid circuit 56 and fluid supply 54. The fluid circuit 56 includes the passages 90, 92, which fluidly couple the respective valve heads and spring pockets of the shift valves 50, 52 to one another as described above. In the variator control circuit 28, the fluid circuit 56 allows the fluid pressure from either the trim system 60 or the trim system 62 to be quickly blocked by quickly changing the position of the shift valves 50, 52.

In the above-described application, the fast valve actuation system 48 may be implemented as a protective measure intended to prevent an unintentional change in torque direction. The fast valve actuation system 48 may also allow the transmission to quickly respond to intentional changes in torque direction. For example, if the electronic control unit 16 detects a shift into reverse commanded by the vehicle operator, the electronic control unit 16 may send control signals to the electro-hydraulic actuators 108, 110 as needed to quickly change the state of the shift valves 50, 52.

A multiple-mode continuously variable ratio transmission has at least two operating modes (e.g. low and high). Each mode is selected by a clutch that is engaged by the application of hydraulic fluid pressure as controlled by the transmission's control unit. Once the transmission is shifted into a given mode, then the transmission ratio is variable as controlled by the variator. The transition from one mode to another is a synchronous shift in which two clutches are applied, momentarily, at the same time.

One such multiple-mode continuously variable ratio transmission has three modes of operation (e.g., M1, M2, M3), with each mode being controlled by a separate clutch (e.g., C1, C2, C3). In mode M1, forward or reverse launch and speeds up to about 10 miles per hour are possible. In mode M2, speeds in the range of about 10-30 miles per hour are possible, in the forward direction. In mode M3, speeds in the range of about 30 miles per hour or higher are possible, in the forward direction.

The transmission is in mode M1 when the C1 clutch is applied, and in mode M2 when the C2 clutch is applied, and in mode M3 when the C3 clutch is applied. The transition from one mode to another thus requires one of the clutches to be released and another of the clutches to be applied. Aspects of the clutch control circuit 30 for such a three-mode continuously variable ratio transmission are described in the aforementioned U.S. Provisional Patent Application Ser. Nos. 61/287,031 and 61/287,038.

At the same time as clutches are being applied and released, the variator control circuit 28 controls the variator ratio. During a transition from one of the modes M1, M2, M3 to another mode, the variator ratio must be such that it allows for (or does not interfere with) the application and release of the appropriate clutches C1, C2, C3. The fast valve actuation system 48 may be used as a preventive measure against undesirable or unintended changes in the variator ratio while mode transitions are taking place.

Additionally, while the transmission is operating normally in one of the modes M1, M2, M3, the fast valve actuation system 48 may be used as described above to quickly correct a change in torque direction that has occurred in error.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

What is claimed is:

1. A system for a transmission, the system comprising:
a variable-ratio unit,
a hydraulic circuit fluidly coupled to the variable-ratio unit, the hydraulic circuit including
 a first fluid chamber pressurizable to apply a first torque transmitting mechanism of the variable-ratio unit,
 a second fluid chamber pressurizable to apply a second torque transmitting mechanism of the variable-ratio unit,
 a first shift valve fluidly coupled to the first fluid chamber to selectively direct fluid pressure to the first fluid chamber, the first shift valve having a first valve head and a first spring chamber axially spaced from the first valve head,
 a first electro-hydraulic actuator fluidly coupled to the first valve head of the first shift valve and actuatable by electrical signals to output fluid pressure thereto,
 a second shift valve fluidly coupled to the second fluid chamber to selectively direct fluid pressure to the second fluid chamber, the second shift valve including a second valve head and a second spring chamber axially spaced from the second valve head, and
 a first fluid passage that fluidly couples the first valve head of the first shift valve directly to the second spring chamber of the second shift valve,
 wherein the first electro-hydraulic actuator is selectively coupled to the second spring chamber through the first valve head and the first fluid passage, and
an electronic control unit coupled to the hydraulic circuit, the electronic control unit including computer circuitry configured to (i) detect a change in torque direction and (ii) actuate the first electro-hydraulic actuator to output fluid pressure to the first valve head to stroke the first shift valve and destroke the second shift valve in rapid succession in response to the detected change in torque direction so that the second fluid chamber is connected to fluid pressure and the first fluid chamber is disconnected from fluid pressure in rapid succession.

2. The system of claim 1, wherein the hydraulic circuit includes (i) a second electro-hydraulic actuator fluidly coupled to the second valve head of the second shift valve and actuatable by electrical signals to output fluid pressure thereto, and (ii) a second fluid passage separate from the first fluid passage that fluidly couples the second valve head of the second shift valve directly to the first spring chamber of the first shift valve.

3. The system of claim 2, wherein the second electro-hydraulic actuator is selectively coupled to the first spring chamber through the second valve head and the second fluid passage.

4. The system of claim 2, wherein the first and second fluid passages do not intersect with each other.

5. The system of claim 1, wherein the computer circuitry is configured to direct the first electro-hydraulic actuator to substantially simultaneously output fluid pressure to the first valve head of the first shift valve and the first fluid passage.

6. The system of claim 1, wherein the first and second torque transmitting mechanisms are variator disk actuators.

7. The system of claim 1, wherein the first and second torque transmitting mechanisms are clutches.

8. The system of claim 1, wherein (i) the transmission is operable in at least three different forward operating modes, and (ii) the computer circuitry is configured to detect the change in torque direction in one of the forward operating modes.

9. The system of claim 1, wherein (i) the transmission is operable in at least three different forward operating modes, and (ii) the computer circuitry is configured to detect the change in torque direction during a transition from one of the forward operating modes to another of the forward operating modes.

10. A system for a transmission, the system comprising:
a variable-ratio unit including a first torque transmitting mechanism and a second torque transmitting mechanism,
a valve assembly actuatable to selectively connect a first fluid chamber coupled to the first torque transmitting mechanism to fluid pressure and disconnect a second fluid chamber coupled to the second torque transmitting mechanism from fluid pressure in rapid succession, the valve assembly including
 a first shift valve having a first valve head and a first spring chamber axially spaced from the first valve head,
 a first electro-hydraulic actuator fluidly coupled to the first valve head of the first shift valve and actuatable by electrical signals to output fluid pressure thereto,
 a second shift valve having a second valve head and a second spring chamber axially spaced from the second valve head, and
 a second electro-hydraulic actuator fluidly coupled to the second valve head of the second shift valve and actuatable by electrical signals to output fluid pressure thereto, and
an electronic control unit coupled to the valve assembly, the electronic control unit including computer circuitry configured to (i) de-actuate the first electro-hydraulic actuator so that fluid pressure is directed through the first shift valve to the first fluid chamber to apply the first torque transmitting mechanism and actuate the second electro-hydraulic actuator to apply fluid pressure to the second valve head and connect the second electro-hydraulic actuator to the first spring chamber of the first shift valve through the second valve head, (ii) detect a change in torque direction, and (iii) stroke the first shift valve and destroke the second shift valve in rapid succession in response to the detected change in torque direction.

11. The system of claim 10, wherein (i) the computer circuitry is configured to actuate the first electro-hydraulic actuator to apply fluid pressure to the first valve head of the first shaft valve, connect the first electro-hydraulic actuator to the second spring chamber of the second shift valve through the first valve head, and disconnect the first fluid chamber from fluid pressure to stroke the first shift valve, and (ii) the computer circuitry is configured to de-actuate the second electro-hydraulic actuator to remove fluid pressure from the second valve head of the second shift valve, disconnect the second electro-hydraulic actuator from the first spring chamber of the first shift valve, and direct fluid pressure through the second shift valve to the second fluid chamber to apply the second torque transmitting mechanism to destroke the second shift valve.

12. The system of claim 11, wherein the computer circuitry is configured to de-actuate the first electro-hydraulic actuator to couple a first pressure control valve to the first fluid chamber.

13. The system of claim 12, wherein the computer circuitry is configured to de-actuate the second electro-hydraulic actuator to couple a second pressure control valve to the second fluid chamber.

14. The system of claim 13, wherein the computer circuitry is configured to actuate the second electro-hydraulic actuator to couple the second fluid chamber to a third pressure control valve.

15. The system of claim 10, wherein the computer circuitry is configured to stroke the first shift valve and destroke the second shift valve in rapid succession in response to the detected change in torque direction in less than about 0.08 seconds.

16. The system of claim 10, wherein the first and second torque transmitting mechanisms are variator disk actuators.

17. The system of claim 10, wherein (i) the transmission is operable in at least three different forward operating modes, and (ii) the computer circuitry is configured to detect the change in torque direction in one of the forward operating modes.

18. The system of claim 10, wherein (i) the transmission is operable in at least three different forward operating modes, and (ii) the computer circuitry is configured to detect the change in torque direction during a transition from one of the forward operating modes to another of the forward operating modes.

* * * * *